United States Patent [19]

Barker et al.

[11] 4,220,683
[45] Sep. 2, 1980

[54] METHOD OF THERMOFORMING AND PRODUCT MADE THEREFROM

[75] Inventors: Peter J. Barker, Royston; Gerald R. Cheal, Welwyn, both of England

[73] Assignee: Imperial Chemical Industries Limited, London, England

[21] Appl. No.: 957,195

[22] Filed: Nov. 2, 1978

Related U.S. Application Data

[62] Division of Ser. No. 785,301, Apr. 6, 1977, Pat. No. 4,141,771.

[30] Foreign Application Priority Data

Apr. 28, 1976 [GB] United Kingdom ............... 17255/76

[51] Int. Cl.$^2$ .......................... B32B 7/00; B65D 7/00; A47K 1/00
[52] U.S. Cl. .......................... 428/35; 4/619; 428/215; 428/516; 428/520
[58] Field of Search .......................... 428/516, 520, 35; 156/222; 4/166, 167, 187 R; 264/241

[56] References Cited

U.S. PATENT DOCUMENTS

| 2,648,099 | 8/1953 | Dunmire | 264/544 |
| 3,205,110 | 9/1965 | Rinderspacher et al. | 156/222 |
| 3,404,056 | 10/1968 | Baldwin | 156/306 |
| 3,579,395 | 5/1971 | Rath | 420/520 |
| 3,629,381 | 12/1971 | Walker | 264/92 |
| 3,971,687 | 7/1976 | Greer et al. | 156/221 |
| 3,971,866 | 7/1976 | Johnson | 428/40 |

FOREIGN PATENT DOCUMENTS

| 1704698 | 7/1971 | Fed. Rep. of Germany . | |
| 49-48185 | 12/1974 | Japan | 428/520 |
| 739436 | 10/1955 | United Kingdom . | |
| 954347 | 2/1964 | United Kingdom . | |
| 1275066 | 5/1972 | United Kingdom . | |
| 1384885 | 2/1975 | United Kingdom . | |
| 1446424 | 8/1976 | United Kingdom . | |
| 1481227 | 7/1977 | United Kingdom . | |

OTHER PUBLICATIONS

"Polythene", *The Technology and Uses of Ethylene Polymers*, A. Renfrew, Oct. 5, 1960, p. 564.

*Primary Examiner*—Ellis P. Robinson
*Attorney, Agent, or Firm*—Cushman, Darby & Cushman

[57] ABSTRACT

A method of thermoforming a thermo-plastics sheet carrying a protective layer of polyethylene on at least one of the surfaces of the sheet comprising heating the assembly of sheet together with its protective layer to above the softening point of the thermoplastic and subsequently stretching the assembly to a desired shape.

3 Claims, No Drawings

METHOD OF THERMOFORMING AND PRODUCT MADE THEREFROM

This is a division of application Ser. No. 785,301 filed Apr. 6, 1977, and now U.S. Pat. No. 4,141,771.

This invention relates to a method of shaping thermoplastics sheets and inparticular to a method of shaping poly(methyl methacrylate) sheets to give shaped articles, particularly articles of sanitaryware, carrying a protective covering which can remain in place to protect the surface of the shaped article up to the time that it is to be used by the consumer.

It is known to protect the surfaces of thermoplastics sheets from damage during transport and handling of the sheets prior to thermoforming the sheets by adhering various protective materials to the sheets which are removed before thermoforming. Paper has been commonly used as a protective material because of its cheapness. The adhesives which have been used to adhere the paper to the thermoplastic are either water soluble adhesives applied as solutions, such as gelatin or hydrolysed polyvinyl acetate or are rubber based, pressure-sensitive adhesives. The former system has been preferred because of its cheapness and the ease with which the paper can be removed from the sheet even after the protected sheet has been stored for long periods. The use of water based adhesives suffers from the disadvantage that for applications in which the surface quality of the thermoplastics sheet is critical imperfections can be introduced unless the adhesive is applied uniformly to the surface of the sheet. These imperfections become noticeable when the sheet is subsequently stretched in a thermoforming operation. The apparently simple operation of applying the adhesive uniformly, in practice requires a high standard of process control.

As an alternative to the use of paper polyethylene film is also used. This is normally applied using hot rolls which adhere the film to the thermoplastics sheet so that additional adhesive is not usually necessary. This process overcomes any problem associated with residual adhesive or uneven application of adhesive to the sheet but gives rise to further problems as a result of the high level of static charge present on the sheet after removing the protective polyethylene film. This static charge is sufficiently high to give a substantial shock to any operator discharging the sheet by manual contact and additionally attracts dust strongly and is a potential fire hazard. It is sometimes necessary to wash the sheet after the polyethylene film has been removed and prior to thermoforming the sheets. It has now been found that polyethylene film protected thermoplastics sheets can be thermoformed without encountering the aforesaid problems arising from static electricity.

A disadvantage of these methods of protecting and shaping sheets is that the resulting shaped article is in an unprotected state after the shaping ooeration and it is inconvenient and expensive to provide a further protective layer to the shaped article. With some shaped articles, particularly sanitaryware, the article is subjected to considerable further handling before the article is finally installed for use by the consumer. During this period the surface of the shaped article is at risk from accidental damage. A method of thermoforming sheets of poly(methyl methacrylate) has now been devised which substantially reduces the extent of the aforementioned problems.

Accordingly there is provided a method of thermoforming a sheet of poly(methyl methacrylate) having a reduced viscosity as hereinbefore defined of at least 1.5, preferably at least 3.0, carrying a protective layer of polyethylene in intimate contact with at least one surface of the sheet comprising heating the assembly of sheet and its protective layer to a temperature of at least 140° C., preferably at least 150° C., until the sheet is in a heat softened condition but insufficiently long for the surface of the sheet to be marred by changes arising in the polyethylene due to the thermal treatment received, subsequently stretching the assembly to a desired shape whilst the polyethylene remains in intimate contact with the sheet.

The changes which can arise in the polyethylene if an excessive thermal treatment is received and which can give rise to loss of intimate contact and marring of the surface of the poly(methyl methacrylate) sheet are various. Shrinkage of the polyethylene relative to the sheet when the sheet is in the softened condition can cause marring but more particularly an increase in adhesion between the polyethylene film and the sheet can result in damage to the sheet surface which is apparent when the polyethylene is eventually removed from the shaped article. Excessive heating can result in degradation of the polyethylene and consequent difficulty in removing the film without surface damage to the shaped article.

By "poly(methyl methacrylate) sheet" is meant a sheet material in which at least the surface which is to form the exposed surface of the shaped article consists of a homopolymer of methyl methacrylate or a copolymer of methyl methacrylate containing a major proportion, and preferably at least 90% by weight of units of methyl methacrylate. The sheet may be, for example, a laminate in which the surface to be used as the exposed surface is a polymer of methyl methacrylate of the required reduced viscosity and the underside of the sheet is of a different thermoplastic material.

The reduced viscosity (RV) of the poly(methyl methacrylate) (as hereinbefore defined) is determined at 25° C. on a solution in chloroform containing 1 g of polymer in 1000 $cm^3$ of solution. Poly(methyl methacrylate) for sanitary ware applications frequently contains small amounts of cross-linking agents. Such polymer cannot be readily characterised by solution viscometry but for the purpose of the invention the backbone molecular weight of the polymer when prepared in the absence of cross-linking agent should still be at least 1.5 and preferably greater than 3.0. The most suitable sheet is that prepared by the known polymerisation casting techniques either in closed cells or between continuous double bands.

Surprisingly, in view of the low softening point and relatively low thermal stability of polyethylene the assembly of sheet and film may be given a sufficient heat treatment to render the high molecular weight sheet readily thermoformable without the polyethylene either shrinking or becoming so well adhered to the poly(methyl methacrylate) that it either damages the sheet surface or is not readily removable after the shaping operation.

In the method of the invention the protective layer remains in place throughout the thermoforming operation and may be readily removed when desired leaving an undamaged surface on the thermoplastics shaped article. The protective layer may be removed immediately after cooling the shaping or optionally is allowed to remain in place as protection unitl the shaped article is finally in use. For example when the sheet has been shaped into a bath shell which requires the application of glass fibre and polyester resin to the underside of the bath to increase the strength and rigidity of the shaping, it is advisable to leave the protective layer in position at least until the reinforcement process has been completed. This prevents the glass fibre and resin from coming into contact with the downturned rim of the bath and avoids subsequent cleaning of the rim to remove any deposited material. It can be advantageous, to reduce the risk of accidental damage to the minimum, to leave the protective film in position until the bath has been fully installed and the water services connected. The film may then be stripped off at the same time serving to collect debris such as bathroom tile fragments, brick or plaster which may have dropped into the bath during construction work.

In addition to the protection conferred by leaving the film in position the advantages which the method of the invention confers are various. Although a static charge will still be present when the film is eventually removed it will normally be less after thermoforming due to decay of the charge. In addition, the removal of the polyethylene film can be carried out at the optimum convenient time. For example, removal prior to the normal inspection of the shaped articles ensures that the static discharge can be carried out in a low fire-risk area and at a time when the article would normally be wiped clean to remove any dust or debris, thus avoiding any extra operations.

The provision of a protective layer is particularly important in the case of poly(methyl methacrylate) sheet because the excellent surface qualities of this material are relatively easily damaged by abrasion. The invention provides a method of protecting articles shaped from poly(methyl methacrylate) against surface damage up to the time when the article is in use.

As a further embodiment of the invention there is provided a shaped article of poly(methyl methacrylate) having an RV of at least 1.5, preferably at least 3.0 carrying a protective layer of poly(ethylene) film in intimate contact with at least one surface of the shaped article.

This aspect of the invention is particularly useful when the shaped article is an article of sanitaryware such as a bath, shower-tray or wash basin because such articles run the risk of damage during building and installation operations.

In most applications it is only necessary that one surface of the sheet is protected because in use only one surface is exposed to view. In the method of the invention it is therefore only necessary to use a thermoplastics sheet protected on one of its surfaces, that is the surface which is eventually to be exposed to view. It is, in fact, advantageous in the method of the invention to operate with only one surface protected because this allows more latitude in the method of thermoforming. It is inadvisable to allow a polyethylene protected surface to come into contact with any hot forming surface when the temperature of the polyethylene is above about 150° C. because the polyethylene may become so firmly adhered to the thermoplastics sheet that it is difficult to remove after the thermoforming operation.

In methods of thermoforming in which a hot metal surface is urged against a softened sheet to produce the desired shape it is essential that the polyethylene is present only on the surface of the sheet not contacted by the metal surface because it has been found that if a hot metal surfce is pressed against the polyethylene it becomes so firmly adhered to either the softened sheet or the metal surface that it is either difficult to remove from the metal surface or the surface of the sheet.

In a preferred method of shaping a sheet of poly(methyl methacrylate) having a reduced viscosity of at least 1.15, preferably at least 3.0 and carrying an adhered protective layer of polyethylene on one surface of the sheet is heated to at least 140° C. until it is in a thermoformable condition, is removed from the source of heat before changes in the nature of the polyethylene cause marring of the sheet surface and is subsequently thermoformed by stretching the softened sheet together with the adhered layer of polyethylene until the unprotected surface makes contact with a mould surface of a desired shape.

The sheets may be stretched to form the shaped article by any of the conventional methods such as the application of vacuum or pressure to stretch the sheet without contact with mould surfaces or by the application of pressure or vacuum to blow or draw the sheet onto a mould surface.

In order to obtain a satisfactory product from the process it is necessary that the heating cycle should give a sufficient heat treatment to enable the sheet to be thermoformed into a good quality moulding but not of such intensity to cause the intimate contact between the polyethylene film and the poly(methyl methacrylate) sheet to be interrupted causing surface damage or to cause the polyethylene to become too firmly bonded to the sheet or to change its character so that it is not possible to remove it clearly from the sheet after it has cooled to ambient temperature.

The conditions for a given thickness of poly(methyl methacrylate) sheet having an RV of at least 1.5 can be determined experimentally in each individual case but it has been found from the experience of a large number of experiments that the preferred conditions can be defined by mathematical relationships involving the thickness of the sheet, the temperature of the oven and the length of the heating period. In a preferred process to ensure good thermoforming behaviour the logarithm (base e) of the length of the heating period should be greater than $$(-0.257715T + 9.1484) - (-0.002754T + 0.0425526)X$$

where T is the thickness of the sheet in millimetres and X is the oven temperature in °C. To ensure satisfactory behaviour of the polyethylene film and a subsequent good quality surface on the shaped article the logarithm (base e) of the length of the heating period should preferably be less than $$(0.240344T^2 - 3.404250T + 20.2842) - (0.001567T^2 - 0.0222875T + 0.105177)X.$$

These preferred conditions define the heating cycles for poly(methyl methacrylate) homopolymer sheet having an RV of at least 1.5, a thickness between about 3.0 mm and 8.0 mm for temperature between at least 140° C. and about 200° C. These conditions are particularly suitable for sheet of RV of 3.0 and above. For sheet of RV between 1.5 and 3.0 conditions which give as short a heat-up period as possible within the prescribed limits should be chosen. As examples of the use of the mathematical relationships it can be calculated that for poly(- methyl methacrylate) sheet of 3.2 mm thickness a satisfactory behaviour is obtained at 150° C. when the heating time is greater than about 15 minutes but less than about 55 minutes. At 200° C. the useful heating period is much narrower, between about 5 and 8 minutes. For the same sheet of 8 mm thickness the preferred ranges are about 45 to 60 minutes at 160° C. and about 20 to 22 minutes at 200° C.

The polyethylene protected (poly(methyl methacrylate) sheet for use in this invention must have the polyethylene film in intimate contact with sheet before the heating and thermoforming operation is commenced. This intimate contact is achieved by the correct choice of polyethylene film and application conditions. The polyethylene film should have a melt flow index as determined using the ASTM Method 1238-70 of between 1 and 4, preferably between 2 and 3. The film must have a thickness of at least 40 microns, preferably at least 50 microns. When the thickness is above 100 microns not only does the protection become more expensive but it is much more difficult to apply the film to the sheet so that it remains in intimate contact with the sheet. For intimate contact the film will also have been treated, at least on the surface to be adhered to the sheet, by corona discharge to improve the adhesion of the film to the sheet when the film is applied to the sheet using heat and pressure. The film may be applied to the sheet by a variety of methods in which heat is supplied either to the sheet or the film so that when pressure is applied to the film/sheet laminate the polyethylene is softened to obtain maximum adhesion to the sheet. In a preferred process rollers at a temperature of about 105° C. are applied with a pressure of about 2 kg/cm² to adhere polyethylene film of 50 micron thickness to poly(methyl methacrylate) sheet, both the film and the sheet being fed to the rollers at ambient temperatures.

Whilst good adhesion between the polyethyleneand the sheet is required in this application process it has been found that those grades of polyethylene which give increased adhesion when the laminate is subjected to the thermoforming temperatures are not suitable for use in the invention because it is not possible to remove the polyethylene without damaging the sheet surface after thermoforming.

It is to be understood that the term polyethylene includes copolymers of ethylene with minor amounts of copolymerisable monomers, but the amount of copolymerisable monomer, if any, should be insufficient to cause any major alteration to the physical properties of the product in comparison with the homopolymer. It is preferred that the polyethylene contains less than 5% by weight of monomers such as vinyl acetate or the esters of acrylic and methacrylic acids. For example, polyethylene containing as little as 6% vinyl acetate as a comonomer has been found to be unsuitable because it is too firmly adhered and has insufficient strength after the thermoforming process to be cleanly removeable. Preferably the film should be composed of a homopolymer of ethylene but in any event should not contain comonomers which give rise to an appreciable increase in adhesion after the film has been applied to the sheet and whilst it is being heated to thermoforming temperatures. Additives, such as slip additives, should also be avoided. In practice the suitability of a particular polyethylene copolymer is readily determined by thermoforming the sheet/film laminates according to the method of the invention and assessing the ease with which the film can be removed from the shaping after thermoforming. It should be possible to remove the film cleanly and without leaving traces of the film on the shaped article.

Although no treatment is necessary to reduce the size of the static charge when the protective film is eventually removed it may be an advantage in some circumstances to reduce the charge produced. This may be brought about by applying an electrically conductive layer on the surface of the thermoplastics sheet before applying the polyethylene film. Convenient materials for providing such a layer are the water soluble, cationic, surface active agents such as alkyl pyridinium bromides. These are usually effective as solutions at concentrations of less than 0.5% by weight of water. Such solutions may readily be applied to the thermoplastics sheet and allowed to dry before applying the polyethylene film by the use of heat and pressure.

The protected sheets may be heated prior to thermoforming by any of the conventional means such as an air oven or by infra-red heaters.

The invention is further illustrated by the following Examples.

EXAMPLE 1

A sheet of poly(methyl methacrylate) of RV 4.0 and 3.2 mm thickness carrying a protective layer of polyethylene homopolymer film (50 microns in thickness and having a Melt Flow Index of 2.3) on one of its surfaces, was heated in a horizontal position with the polyethylene film uppermost in an electrically heated air oven maintained at a temperature of 200° C. The sheet was removed after a period of 5 minutes and carried horizontally to a vacuum mould chamber. After clamping the sheet above the mould the softened sheet was drawn by vacuum so that the unprotected surface contacted the mould surface. After allowing the sheet to cool to about 50° it was removed from the mould. The polyethylene film was removed from the sheet without difficulty. The surface quality of the sheet under the film was excellent.

EXAMPLE 2

The procedure of Example 1 was repeated using a sheet of 8 mm thickness. The sheet and protective polyethylene film were heated at 165° C. for 40 minutes before thermoforming in a mould as described. After thermoforming the film was readily removed to give a shaped article of excellent surface finish.

EXAMPLE 3

The procedure of Example 1 was repeated using sheets of varying thickness at a temperature of 165° C. The results, shown below, indicate a very satisfactory performance. Although the films were removed after cooling to examine the surface of the shaping, trials have shown that the film will remain in place to give effective protection at least for several months and is still readily removeable at that time.

| Film | Sheet Thickness (mm) | Oven Temperature (°C.) | Heating Time (mins) |
|---|---|---|---|
| Polyethylene homopolymer (MFI = 2.3) | 3.2 | 165° C. | 20 |
| Polyethylene homopolymer (MFI = 2.3) | 5.0 | ″ | 35 |

| Film | Sheet Thickness (mm) | Oven Temperature (°C.) | Heating Time (mins) |
|---|---|---|---|
| Polyethylene homopolymer (MFI = 2.3) | 8.0 | " | 45 |

In all cases the film was easily removed on cooling leaving the surface of the shaping unblemished.

COMPARATIVE EXAMPLE

The procedure of Example 1 was used to evaluate the performance of various types of polyethylene film. The evaluation was one on sheet of 3 mm thickness at an oven temperature of 165° C. for 20 minutes. The results obtained were as follows:

| Film | Comments |
|---|---|
| Polyethylene containing 1% glyceryl monooleate | Film was holed during heating leaving surface marks after removal of the film. |
| Polyethylene containing 6.4% vinyl acetate | Film was extensively bubbled causing surface marking and was very difficult to remove. |
| Polyethylene containing 7.5% vinyl acetate comonomer (MFI = 2.0) | Film extensively bubbled, surface marking on shaping, difficulty in removing film. |

We claim:

1. A shaped article which has been shaped from a sheet of poly(methyl methacrylate) having a thickness of at least 3.0 mm, a reduced viscosity of at least 1.5 and carrying an adhered protective layer of polyethylene having a melt flow index as measured by ASTM Method 1238-70 of between 1 and 4 and having a thickness of at least 40 microns wherein the polyethylene is in intimate contact with at least one surface of the shaped article.

2. A shaped article according to claim 1 in which the reduced viscosity of the poly(methyl methacrylate) is at least 3.0.

3. A shaped article according to claim 1 in which the article is an article of sanitaryware such as a bath, shower-tray or wash basin.

* * * * *